Dec. 6, 1927.

A. E. MAYNARD 1,651,532

LENS EDGING MACHINE

Filed Dec. 3, 1924

INVENTOR
Albert E. Maynard
BY
Harry H. Styll
ATTORNEY

Dec. 6, 1927.
A. E. MAYNARD
1,651,532
LENS EDGING MACHINE
Filed Dec. 3, 1924    3 Sheets-Sheet 3

INVENTOR
Albert E. Maynard.
BY
Harry H. Styll
ATTORNEY

Patented Dec. 6, 1927.

1,651,532

UNITED STATES PATENT OFFICE.

ALBERT E. MAYNARD, OF SOUTHBRIDGE, MASSACHUSETTS, ASSIGNOR TO AMERICAN OPTICAL COMPANY, OF SOUTHBRIDGE, MASSACHUSETTS, A VOLUNTARY ASSOCIATION OF MASSACHUSETTS.

LENS-EDGING MACHINE.

Application filed December 3, 1924. Serial No. 753,671.

This invention relates to improvements in lens manufacturing machinery, and has particular reference to a lens edging machine and an improved lens shape controlling means therefor.

In the production of ophthalmic lenses there are a number of different standard shapes used, some of which are preferred by certain people and others are also preferred in their own way. It, therefore, becomes necessary for the ordinary optical prescription shop to be able to produce lenses of different shapes and for this purpose ordinary lens forming machines have been equipped with a number of interchangeable steel formers, the shape of which may be imparted to the lens. The majority of such machines have been so constructed that the formers could be mounted upon the end of the lens holding carriage, and in order to grind different shapes one former would have to be taken off and another put on. This changing of formers has necessitated a certain amount of labor which is eliminated by the present invention.

In the production of the interchangeable formers as used prior to this invention they have been so constructed that usually their major axes have been equal and, therefore, in order that the finished lens may have the required size to fit a standard frame certain tables had to be referred to and adjustments made in the machine so that the periphery of the finished lens would be of the desired amount. The ordinary spectacle frames are made circular in shape and, therefore, they have to be stretched in order to accommodate an elliptical or drop eye lens.

From this is will be obvious that the finished periphery or circumference is of vital importance in order that the lens will accurately fit.

The present invention contemplates the production of a plurality of formers each of a different shape but all having an equal circumference so that adjustments for different shapes or reference to tables will be unnecessary.

An important object of the present invention is to provide a machine which will be adapted for edging a number of standard shapes of lenses.

Another object is to provide such a device with a plurality of shape controlling formers adapted to be selectively moved into operative position with a minimum amount of labor.

Still another object is to provide such a device whereby a number of different shapes may be provided for fitting into standard size frames without necessitating reference to tables or special adjustments of the mechanism.

Another object is to provide such a device with a plurality of shape controlling formers which are adapted to be bodily rotated about a definite center in order to selectively position the same.

Another object is to provide such a device with a provision for a convenient application of a special shaped former.

Another object is to provide such a device with a plurality of former contact shoes which may be selectively used to produce lenses of different sizes.

Another object is to provide such a device with a plurality of former contact shoes rotatably mounted for selective positioning.

Another object is to provide such a device wherein size and shape adjustments may be obtained positively and simply.

With these and other objects in view the invention resides in the novel features of construction, combination and arrangement of parts hereinafter fully set forth, illustrated in the accompanying drawings and specifically pointed out in the appended claims.

In the drawings forming a part of this application,

Figure 1:
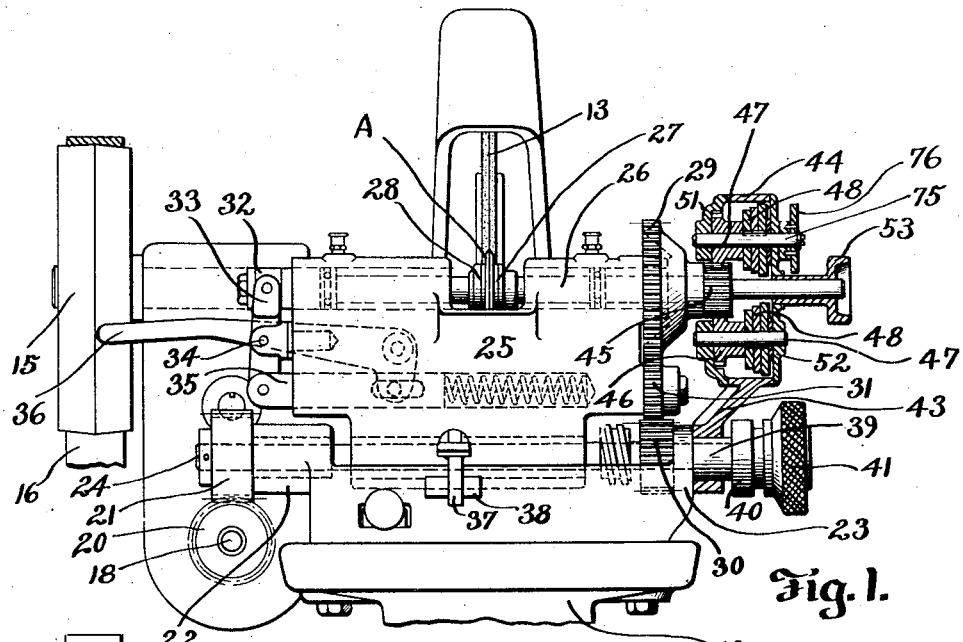
Figure 1 is a front elevation of a lens edge grinding machine embodying the invention.
Figure 2:
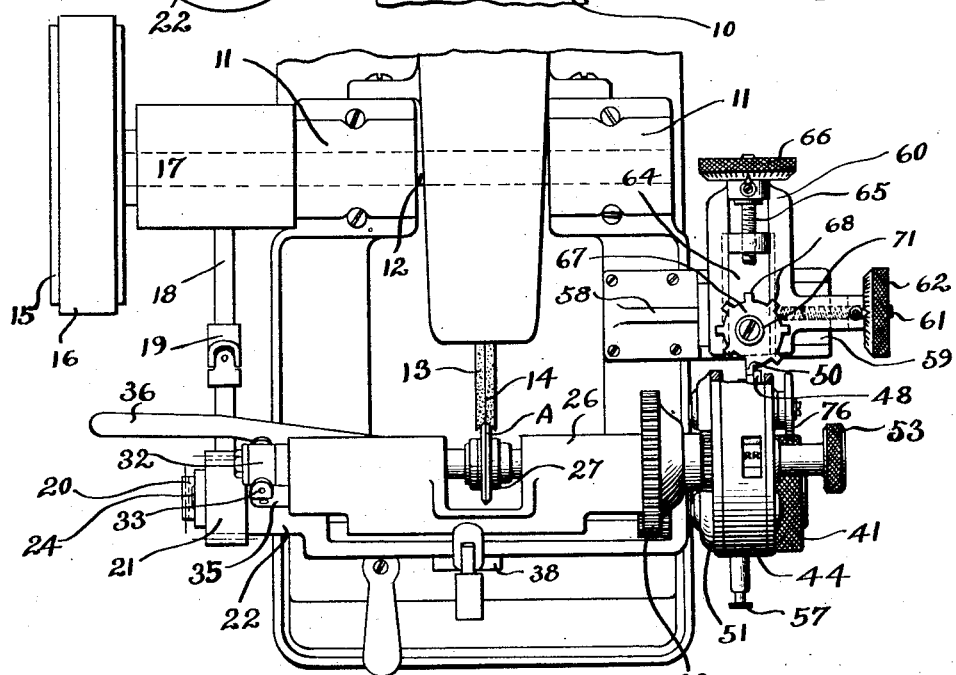
Figure 2 is a fragmentary top plan view thereof.
Figure 3:
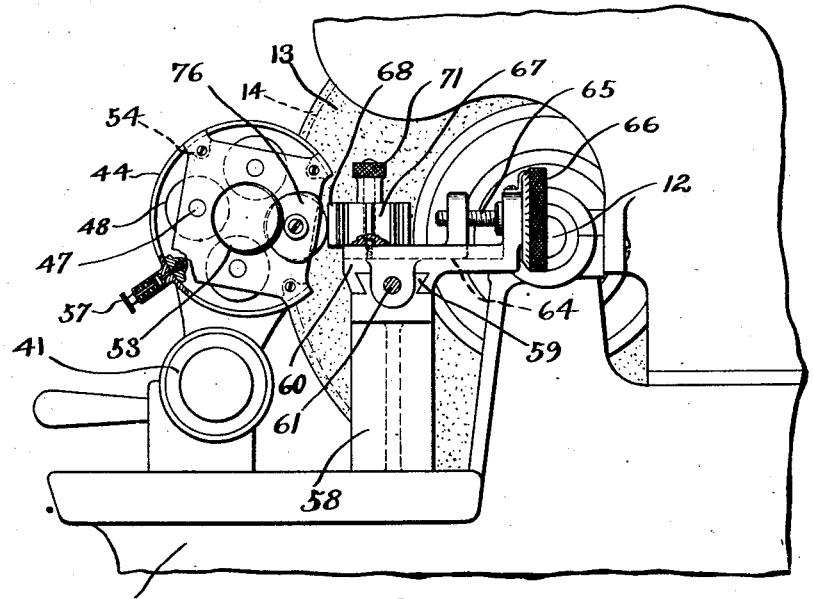
Figure 3 is an end elevation of the same.
Figure 4:
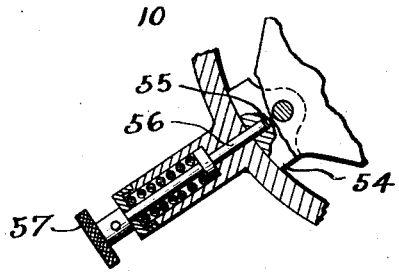
Figure 4 is a fragmentary detail sectional view through the former locking means.

Similar reference characters designate corresponding parts throughout the several views. In carrying out the invention, a tub or base 10 of any ordinary or preferred construction is provided with bearings 11, in which is rotatable a shaft 12, which carries a grind-stone 13. As shown in Figures 1 and 2, the grind-stone 13 has a grooved periphery, as at 14, in which the edge of a lens is adapted to operate so that said lens will be bevelled for fitting into an ophthalmic frame. On the end of the shaft 12 is a pulley 15 which provides power for the operation of the various parts of the machine, said pulley being driven by a belt 16 from a motor or a counter-shaft as may be desired. Disposed at one side of the base 10 is a transmission housing 17 in which are mounted suitable gears which are driven by the shaft 12 and to which is connected a forwardly extending intermediate drive shaft 18 having a universal joint 19 therein. The forward end of the shaft 18 carries a spiral gear 20 which is adapted to mesh with another gear 21 mounted on the forward end of the device.

A pair of bearings 22 and 23 at the front side of the base 10 is adapted to support a longitudinal shaft 24 which carries the spiral gear 21. Disposed between the two bearing members and pivotally mounted upon the shaft 24 is a lens carriage generally designated by the reference character 25. The carriage 25 contains a shaft 26, at the extremity of which is a lens clamping pad 27 which is adapted to cooperate with an adjustable lens clamping member 28 in axial alinement therewith. Rotary motion is imparted to the shaft 26 through the instrumentality of a gear 29 driven from a pinion 30 on the lower shaft 24 and preferably through an idler 31. The outer extremity of the lens clamping member 28 is suitably grooved as at 32 for the reception of the forked end of the lever 33 which is fulcrumed as at 34 and having its opposite end pivotally connected to a spring pressed plunger 35 which is partially disposed within the carriage. The plunger 35 is operated through the instrumentality of a pivoted handle member 36 whereby when the same is depressed the plunger 35 will be moved inwardly and the lens clamp 28 will be moved away from the member 27. Adjacent the lower part thereof the carriage 25 carries a pivoted latch member 37 which is adapted to hook under a lip 38 for the purpose of holding the free end of the carriage in inoperative position, such as when it is desired to change lenses or when the machine is not in use.

The pinion 30 is mounted upon a sleeve 39 which extends through the bearing member 23 and has at its outer end a clutch member 40, the said sleeve being free to rotate in relation to the shaft 24. A second clutch member 41 is splined to the shaft 24 and adapted to engage the clutch member 40 so that rotary motion may be imparted from the shaft 24 to the pinion 30, or if desired the clutch may be disengaged so that the pinion will not rotate.

Figure 7:
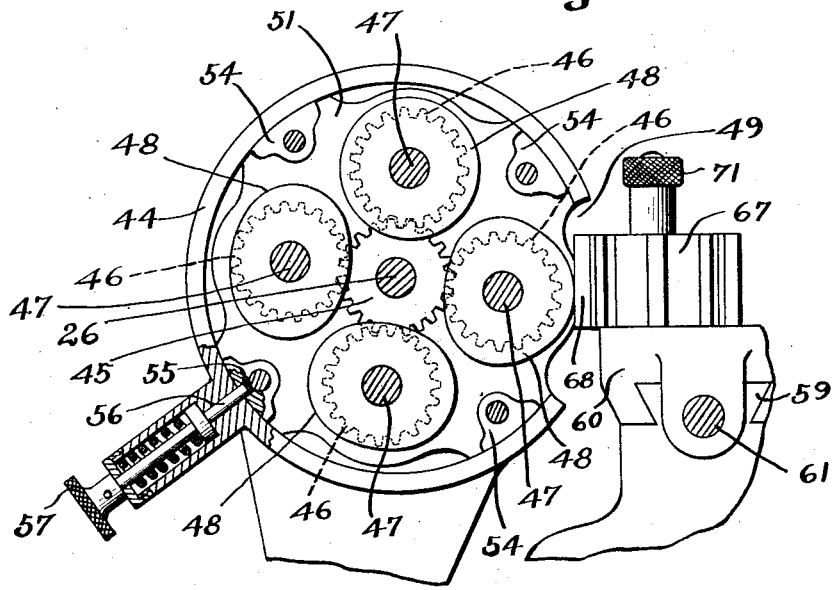
Figure 7 is an enlarged detail end view of the former carrying mechanism, parts being broken away and parts in section.

Supported upon the sleeve 39 is a bracket member 43 which has an enlarged annular head 44 upon its upper end which is concentric with the upper shaft or spindle 26. An idler gear 45 is mounted on the spindle 26 and extends into the annular housing 44, said idler being adapted to mesh with a plurality of gear members 46, as best shown in Figure 7. Each of the gear members 46 is mounted upon a shaft 47 which extends entirely through the housing 44 and carries a plurality of shape controlling formers 48, each of said formers having a different shape, but so constructed that their circumferences will be equal. At the rear side of the housing 44 an opening 49 is provided so that a selected former 48 may engage a contact shoe or back rest 50. Thus it will be seen that as the spindle 26 is rotated through the gear train previously described synchronous motion will be imparted to the formers 48, and since the carriage 25 supporting the same is pivotally mounted the spindle 26 will be moved towards and away from the grindstone 13 in accordance with the shape of the engaging former.

A pair of end plates 51 and 52 are clamped on the annular housing 44 and connected by the small shafts 47 as an integral rotating structure. A knurled wheel 53 is attached to the plate 52 so that the same may be bodily moved and a plurality of connecting blocks 54 are also provided to keep the parts in their proper alinement. Each of the connecting blocks 54 has a recess 55 which is adapted to be engaged by a spring pressed plunger 56, slidably mounted in the housing 44 and operative through the thumb latch member 57. Thus engagement of the plunger 56 in the recess 55 will lock the plates 51 and 52 and their associated parts in a selected position. When it is desired to use another shape controlling former which is on a different shaft 47, it is only necessary to pull out the thumb latch 57 and rotate the former battery through the instrumentality of the knurled wheel 53 until the proper shape is brought into operative position in line with the opening 49.

The back rest 50 comprises a support 58, which is mounted upon the base 10 of the machine, and having a dove tail rib 59 upon its upper end for the engagement of a supporting carriage 60 which is operative by means of a screw 61 and knurled wheel 62. The carriage 60 is further provided with a dove tail slide-way 63 disposed at right angles to the rib 59 and adapted to carry a plate 64 which is adjustable by means of a screw 65 and knurled wheel 66.

Figure 5:
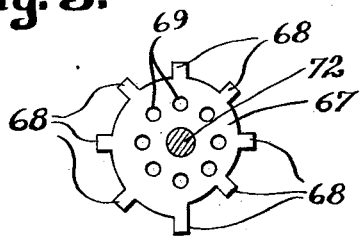
Figure 5 is a bottom plan view of the adjustable multiple contact shoe.
Figure 6:
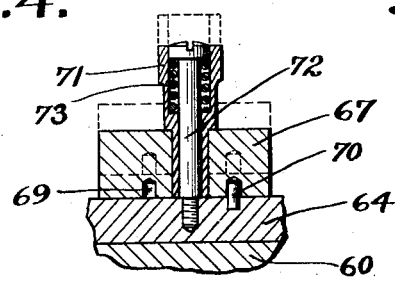
Figure 6 is a vertical sectional view through the same.

As best shown in Figure 5, a step cam 67 is provided, which has a plurality of former contact shoes 68 disposed upon its periphery, each of said former shoes being a different distance from the center of the cam 67. The bottom surface of the cam is further provided with a number of recesses or notches 69 of the same number as that of the shoes 68, said notches being adapted to selectively receive a post or pin 70 which is secured in the surface of the sliding plate 64. A thumb grip 71 is secured in any suitable manner to the step cam 67 and the whole device is held in place upon the slide 64 by means of a screw 72 under the head of which is a compression spring 73 which is adapted to force the step cam 67 against the plate 64 and hold the pin 70 in registry with the selected notch 69. In view of the fact that each of the contact shoes 68 is a different distance from the center of rotation 72 it will be obvious that by selectively using said contact shoes a number of different sized lenses may be produced. The longitudinal adjustment of the member 60 by means of the screw 61 and wheel 62 is for the purpose of engaging the various formers upon each of the shafts 47, and the purpose of the adjustment of the plate 64 through the screw 65 is to compensate for wear of the stone. Ordinarily in the grinding of lenses there is no adjustment of the plate 64 necessary, said adjustment only being made after the stone has worn down a certain extent.

In the use of the device a lens A is clamped between the members 28 and 27 and the selected former 48 is positioned in alignment with the opening 49 in the housing 44 so that the required shape will be produced. The step cam 67 is then rotated, as has been previously explained, so as to position the proper contact shoe 68 to govern the finished size of the lens, whereupon motion is transmitted through the gears 20 and 21, the shaft 24, the clutch members 41 and 40, and the gears 30, 31 and 29, all of which will be obvious to those skilled in the art. As the lens A is rotated against the periphery of the grind-stone 13 the selected former 48 will also be synchronously rotated against the contact shoe 68 and in view of the fact that all of the formers have equal circumferences, any of the lenses so ground will readily fit a standard size frame without necessitating special adjustment of the operating parts of the machine.

Figure 8:
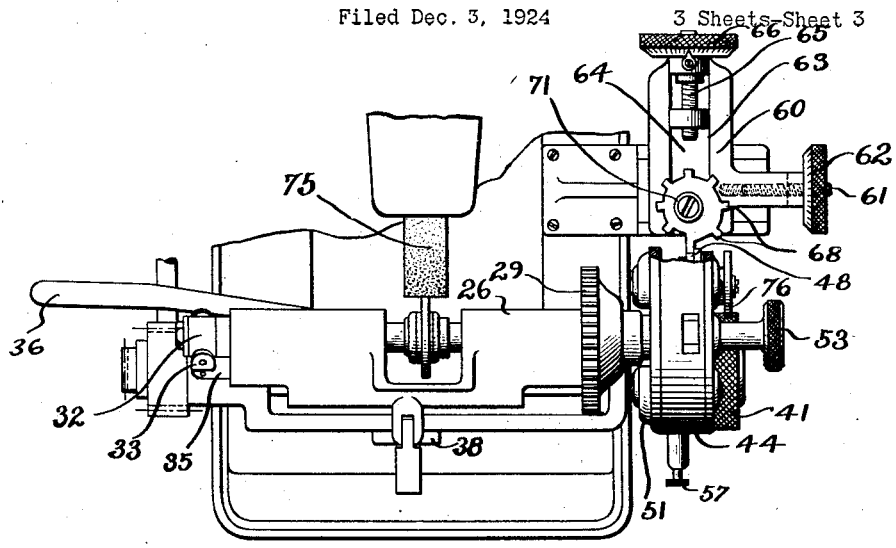
Figure 8 is a fragmentary top plan view showing the device applied to a rimless edging machine.

In the machine which has just been described the lens A is being bevelled for the reception in a frame. However, the device may be used equally well upon any other type of lens forming machine. For example, in Figure 8 it is shown in connection with a rimless grinder wherein a plain grinding wheel 75 is mounted upon the shaft 12 for operation upon the lens. Except for the change in the shape of the stone the cooperation of the parts is the same in both forms.

It will be understood that the former members 48 which are enclosed within the housing 44 are each of a standard shape such as is quite frequently demanded of the different prescription shops in the optical business. It often becomes necessary to produce a lens of a special shape and in order to provide for such necessities one of the shafts 47 is extended as at 75 in Figure 1 so as to be capable of receiving the special shaped former 76. This former will be secured to the shaft 47 in any desirable manner so as to be rotatable therewith and it is adapted to engage anyone of the former contact shoes 68 as will be apparent. In this manner, provision is made for grinding both standard shapes and any special shaped lenses which may be desired.

Obviously, changes may be resorted to in the minor details of construction, combination and arrangement of parts, and the right is herein reserved to make such changes falling within the scope of the appended claims without departing from the spirit of the invention. While the invention has been illustrated and described for grinding the edges of lenses, it can be utilized to equal advantage for cutting lenses or cutting, edging, or shaping other objects, the preferred form being described only by way of illustration.

Having thus described my invention, I claim:

1. In a lens forming machine, the combination with a lens clamp, of a plurality of differently shaped formers adapted to be selectively used to control the shape of the finished lens, all of said formers having equal circumferences.

2. In a lens forming machine, the combination with a rotatable lens clamp, of a plurality of differently shaped formers, all of said formers having equal peripheries, and means for engaging a selected former.

3. In a lens edge grinding machine, a base, an abrasive wheel rotatably mounted thereon, a swinging carriage on the base adjacent the periphery of the abrasive wheel, a lens clamping spindle carried by the carriage, a plurality of shape controlling formers mounted on the carriage, a former contact shoe disposed on the base, means for moving the formers in an orbital path so as to position a desired one in engagement with the contact shoe, and means for rotating the selected former and the lens spindle synchronously.

4. In a device of the character described, the combination with a lens holder, of a movable support for the lens holder, of a plurality of former members rotatably mounted about the lens holder axis as a center, a back rest fixed in relation to the movable lens holder, means for rotating the former members about the lens holder as a center to position a selected one in engagement with the back rest, and means for synchronously rotating the lens holder and the selected former.

5. In combination with shaping mechanism and mechanism for holding the article to be shaped, guide former means for controlling the shape to be made, comprising a plurality of batteries of former shapes, each battery having a plurality of formers, a former contact member, and means for engaging any one of the formers with the contact.

6. In combination with shaping mechanism and mechanism for holding the article to be shaped, a plurality of separated and unaligned former shapes for controlling the shape to be made, a former contact member, and means for engaging any one of the formers with the contact.

7. In combination with shaping mechanism and mechanism for holding the article to be shaped, a plurality of separated and unaligned former shapes adapted to control the shape to be made, a former contact member having a plurality of separated contact points, means for bringing any one of the formers in alignment with a contact point, and means for bringing any one of the contact points into engagement with the aligned former.

8. In combination with shaping mechanism and mechanism for holding the article to be shaped, guide former means for controlling the shape to be made, comprising a plurality of batteries of former shapes, each battery having a plurality of formers, a former contact member having a plurality of contact points, means for bringing any one of the formers in alignment with a contact point, and means for bringing any one of the contact points into engagement with the aligned former.

ALBERT E. MAYNARD.